Jan. 9, 1940.  M. F. MILLER  2,186,204

COMBINED TRIP RECORD AND MAP

Filed March 27, 1939

INVENTOR,
Milo F. Miller.
BY Hovey & Hamilton,
ATTORNEYS.

Patented Jan. 9, 1940

2,186,204

UNITED STATES PATENT OFFICE 2,186,204

COMBINED TRIP RECORD AND MAP

Milo F. Miller, Kansas City, Mo.

Application March 27, 1939, Serial No. 264,409

4 Claims. (Cl. 281—5)

This invention relates to maps and particularly road maps used by motorists, and the primary object is to provide in such a device a trip record adapted to receive entries from time to time as the map is being used as a source of information during a trip.

One of the important aims of this invention is the provision of a combined trip record and road map wherein the trip record consists of a removable slip superimposed upon a face of one panel of the map and held in position so that entries may be made when the map is folded.

A still further object of this invention is to provide a trip record and map wherein a plurality of sections and panels comprise the sheet upon which is printed the road map and wherein is formed a series of indicators for the purpose of designating the sequence of use of the several lines of fold formed in the sheet and through the use of which the map portion of the device is converted into a relatively small packet.

A further object of the instant invention is to provide a device of the aforementioned character wherein the sheet having the map formed thereon has a plurality of lines of fold to divide the sheet into panels, said sheet being equipped with indicators so that the same may be folded to consistently present on the outside of the folded sheet on the face of one of the panels, whereupon a record sheet is superimposed the said one panel having thereon a specially formed device for removably holding the record sheet in place where a portion of one side thereof is accessible to receive entries.

Another object of this invention is to provide a road map with means on one panel thereof for holding a record sheet against the face of said one panel so that the folded map becomes a backing for a relatively thin sheet which is to receive entries, there being means for removably carrying the sheet which not only stiffens the outer panel of the map upon which the record sheet is placed, but is of such a size with respect thereto and the record sheet, that a marginal portion of both the panel and record sheet is exposed.

The specific manner of forming a combined trip record and map in accordance with this invention, is set down in the following specification, referring to the accompanying drawing wherein.

Figure 3:
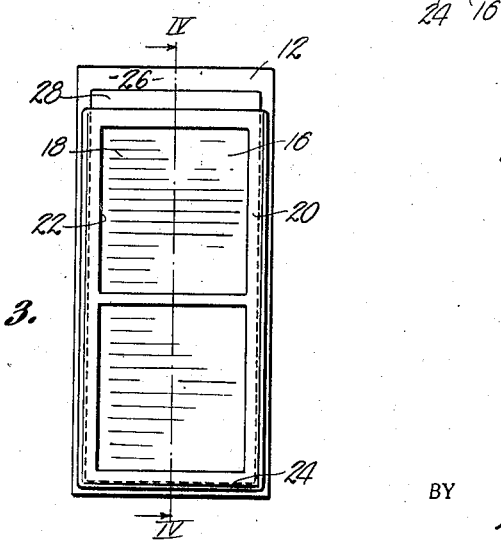
Fig. 3 is a plan view of the map after the same has been folded, showing the record slip and holder therefor, in position on one panel; and, Fig. 4 is a longitudinal cross sectional view taken on line IV—IV of Fig. 3.
Figure 4:
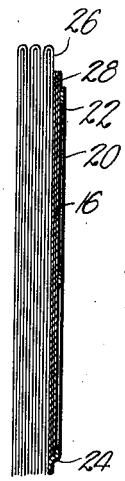

It is customary to provide road maps that are printed upon large sheets 8 of paper or similar, foldable material, and to form in such sheets, lines of fold 10 along which the sheet may be bent when converting it into a packet or small bundle, shown in Fig. 3.

The lines of fold set off a plurality of sections and panels, and as the sheet is folded the exposed faces thereof become smaller in area until one panel 12 is all that has one face thereof presented to view.

Difficulties arise in folding sheet 8 along lines 10 and in the majority of cases, after the sheet has once been opened to its fullest extent, it is hard to collapse the sheet by folding the same along lines 10 in a proper sequence. Sheet 8 has therefore been formed to provide indicators 14, which in this instance, are small numerals created by punching out parts of the sheet body so that the opening made is in the form of a numeral.

Figure 1:
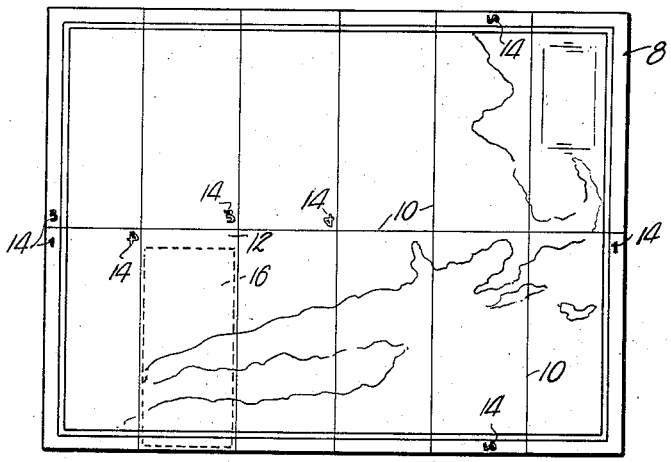
Figure 1 is a face view of a road map made in accordance with the present invention.
Figure 2:
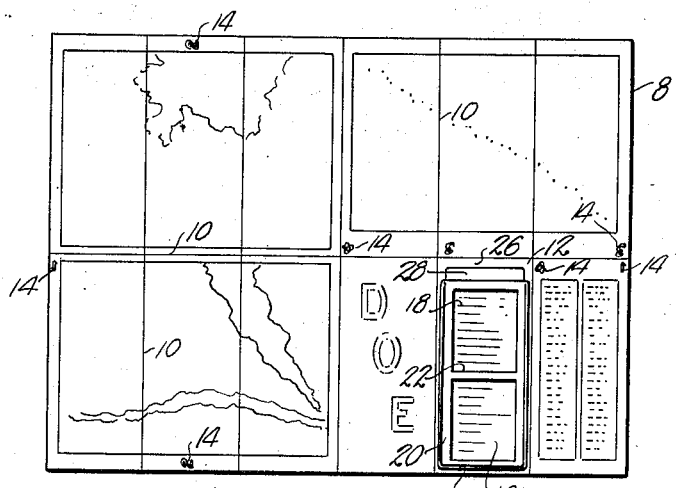
Fig. 2 is a view of the other face thereof.

In a map of the type illustrated, the sheet may be completely collapsed through four motions. When the sheet is open, as seen in Fig. 1, designators 14 are exposed and should be brought together so that one overlies the other. Designators 14 are arranged in pairs of like nature and the first one used is a pair consisting of two numerals 1. The next pair of designators exposed will be the numerals 2; the following pair, the numerals 3; and the final pair, the numerals 4. In each instance, like numerals of the pairs are brought together or adjacent to each other, and when sheet 8 is completely folded, panel 12 is on the outside. This panel 12 will always be in such position, if the designators are followed, to eliminate inaccurate movements in the operation.

The map has a trip record slip 16 on said one panel 12, and when the aforesaid designators 14 are properly used, this trip record slip 16 will always be exposed to receive entries when the map has been closed. Trip record slip 16 has blanks or lines 18 thereon for the purpose of receiving such entries as the traveler may desire to make, and there may be a slip 16 for each day's travel. Such information as name of hotels, cost of meals, amount of gasoline and oil consumed, and other pertinent data, is always kept and these individual record slips may be arranged one behind the other in the specially formed frame 20, which is mounted directly upon the outer face of panel 12.

Frame 20 is made of relatively stiff material, such as fibre board or the like, and when secured to panel 12 serves to stiffen the same and add rigidity to the packet which is employed as a support for slip 16 as entries are being placed thereon.

Frame 20 has windows 22 formed therein through which is exposed portions of the face of slip 16. Frame 20 is offset as at 24 to present a space between the outer face of panel 12 and the inner face of the frame so that a number of slips 16 may be removably held in position.

Frame 20 is shorter than panel 12 and leaves a marginal portion 26 of said panel exposed. On this space the distributor of the map may place such advertising as is desired, and the space serves as backing for the projected marginal portions 28 of slip 16. These portions 28 are gripped between the thumb and forefinger of the operator when manipulation of the slips is necessary or desired. The marginal edges 28 of slip 16 may be "fanned" so that the front or uppermost slip may be withdrawn and placed behind the remaining ones as a fresh slip is brought to view through windows 22.

The manner of manipulating a trip record and map embodying this invention has been made clear during the course of the foregoing specification, and it is obvious to one skilled in the art that the employment of designators 14 in an intelligent manner, will always present to view the one panel 12 whereon is superimposed a number of slips serving as convenient receivers of entries during that portion of the trip where the map printed on sheet 8 is used as a guide.

It is understood that combined trip record and road maps may be made to embody this invention which have characteristics other than those illustrated and described, and therefore, it is desired to be limited only by the spirit of the invention and scope of the appended claims.

Having thus described the invention, what is claimed as new and desired to be secured by Letters Patent is:

1. A trip record and map of the character described comprising a flexible sheet having lines of fold formed therein dividing the same into a plurality of sections and panels; and openings in the form of indicia provided in said sheet to designate the sequence of use of said lines of fold, said openings being arranged in pairs of like indicia and disposed in opposed relation when the map is folded.

2. A trip record and map of the character described comprising a flexible sheet having lines of fold formed therein dividing the same into a plurality of sections and panels; and openings in the form of numerals provided in said sheet to designate the sequence of use of said lines of fold, said openings being arranged in pairs of like numerals, like numerals being disposed in superimposed relation when the sheet has been bent along all the lines of fold.

3. A trip record and map of the character described comprising a flexible sheet having lines of fold formed therein dividing the same into a plurality of sections and panels; and openings in the form of numerals provided in said sheet to designate the sequence of use of said lines of fold, said openings being arranged in pairs of like numerals, the numerals of each pair being adjacent to each other when the sheet has been bent along all the lines of fold.

4. A map of the character described, having a record sheet carrier comprising a flexible sheet having lines of fold formed therein dividing the same into a plurality of panels; and openings in the form of indicia provided in said sheet to designate the sequence of use of said lines of fold whereby the record sheet carrier on one face of one of said panels will be positioned at the outer side of the superimposed panels when the sheet has been folded along all of said lines of fold.

MILO F. MILLER.